United States Patent [19]
Barboza et al.

[11] Patent Number: 5,468,397
[45] Date of Patent: Nov. 21, 1995

[54] GAS BACKWASH OF PLEATED FILTERS

[75] Inventors: Steven D. Barboza, Baltimore, Md.;
William P. Seeley, Shrewsbury, Pa.;
Anthony C. Shucosky, Timonium, Md.

[73] Assignee: Memtec America Corporation, Timonium, Md.

[21] Appl. No.: 32,009

[22] Filed: Mar. 16, 1993

[51] Int. Cl.⁶ ............................................ B01D 29/66
[52] U.S. Cl. .......................... 210/798; 210/808; 95/279; 95/281
[58] Field of Search ...................... 210/791, 797, 210/798, 793, 412, 808; 55/302; 95/278, 279, 281

[56] References Cited

U.S. PATENT DOCUMENTS

| | | | |
|---|---|---|---|
| 3,666,097 | 5/1972 | Ryan | 210/798 |
| 3,891,551 | 6/1975 | Tiedemann | 210/798 |
| 4,405,466 | 9/1983 | Giannelli et al. | 210/798 |
| 4,540,490 | 9/1985 | Shibata et al. | 210/412 |
| 5,149,449 | 9/1992 | Strid et al. | 210/798 |

*Primary Examiner*—Robert A. Dawson
*Assistant Examiner*—W. L. Walker
*Attorney, Agent, or Firm*—Waldron & Associates

[57] ABSTRACT

In critical filtration applications, filter cartridges are employed to replace ion exchange resin precoat filters to minimize the waste produced. The filter cartridges are backwashed with all gas and the liquid in the filter housing provides an active scouring effect as a result of the high levels of turbulence produced. The liquid, with entrained debris from the filter is minimized in volume.

11 Claims, 4 Drawing Sheets

GAS BACKWASH OF PLEATED FILTERS

TECHNICAL FIELD

The present invention relates to the field of filtration, and particularly to high performance filtration, such as the use of filters in nuclear power generating stations to remove low level radiation waste from fluid streams.

RELATED CASES

Commonly assigned application Ser. No. 07/844,460 is related to the present invention as an improvement in the state of the art of ion exchange resin precoat filters, and particularly to improvements in septa for such precoat filters. It is not material to patentability of the claims of the present invention, but is definitive of the state of the art in current practice in the context of the present invention.

U.S. Pat. Nos. 4,767,539, 4,793,932, 4,931,186, 4,935,143 and 5,024,762 are assigned to an affiliate of applicants' assignee, and employs a backwash technique similar to that of the present invention in the context of hollow fiber membrane filters. These patents do not teach or suggest the employment of the techniques with flat sheet membranes, and particularly not in the context of pleated filter cartridges, and do not lead those of ordinary skill in the art to the resolution of the unique and distinct problems and limitations associated with pleated filter cartridges. Applicants do believe that these patents represent the most relevant prior art to the patentability of the present claims.

BACKGROUND

The present invention has arisen in response to demand in the power generating industry for improved filtration of liquids containing suspended solids present in the steam condensate system in nuclear and fossil fuel electrical generation stations. The benchmark requirement is the removal of suspended solids from steam condensate streams, which accumulate over time at very low levels, on the order of 5 to 20 parts per billion (ppb), of which a percentage may be radioactive. These operations are known as "condensate polishing."

The removal of these contaminants from the condensate is essential to the safety, prevention of corrosion within the piping system and of damage to pumps, valves and other components, and to the regulatory compliance of nuclear generating stations. The requirements of condensate polishing stands as one of the most demanding filtration operations.

In practice, condensate polishing is sometimes performed as a multistage filtration operation, employing a powdered ion exchange precoat filter as a pre-filter to remove a substantial increment of the suspended and dissolved solids and particularly the largest particles, from the condensate stream, followed by a deep bed ion exchange filter to remove the remaining contaminants.

The demands on the system are acute. While the state of the art systems are highly effective, they produce substantial volumes of spent ion exchange resins and spent precoat filters and components, which may be radioactive, and which accumulate at an undesirable level.

One of the demands of the system is the limited capability to regenerate ion exchange resins containing contaminants having particle sizes greater than about 2 to 3 micrometers in diameter. It is this limitation which the pre-filter is intended to satisfy, protecting the deep bed ion exchange resin final filter from such components.

There is increasing interest in the nuclear power industry in the usage of absolute filters as replacements for the ion exchange precoat filters frequently employed in the pre-filter role at present. Absolute filters are those having a surface barrier to the passage of particles larger than some particular size, as contrasted with depth filters, which entrain and entrap particles within the depth of the filter medium. Depth filters are generally limited in their capacities as debris accumulates, because the debris cannot be removed and once the filter is fully loaded, it must be discarded and replaced. Absolute filters are more amenable to cleaning.

A major driving force behind the exploration of new filtration techniques in the nuclear power generating industry is the problem of handling, storing and shipping radioactive waste materials. Indeed, the problem has recently become even more acute, as radwaste materials may no longer be shipped at all, and must be stored on site for the foreseeable future and beyond. The volume of such radwastes is a particular difficulty, as the storage areas are limited and such materials continue to be produced and to accumulate. The industry is acutely in need of techniques which reduce the volume of materials to be stored for indefinite period of time.

Two major categories of filters have been suggested for use in the pre-filter role in condensate polishing operations. These include the hollow fiber membrane filters, such as those disclosed in U.S. Pat. Nos. 4,767,539, 4,793,932, 4,931,186, 4,935,143 and 5,024,762, cited above, and pleated filters of nonwoven webs or fabrics. These filters eliminate the volume of the ion exchange resins which may be produced as low level radwaste in usual condensate polishing operations. While the hollow fiber membrane filters are excellent performers, they are costly. Nonwoven fabrics have heretofore had quite limited performance, particularly in the effectiveness of backwashing techniques. The permeability of nonwovens generally shows a progressive decline over time, indicating the limited effectiveness of backwashing operations and the accumulation of debris within the fabric which is not effectively removed by the backwash and which limits the filtration efficiency and effective life span of such filters. Such nonwovens are intrinsically less effective as absolute filters than asymmetric membrane filters.

The normal backwash techniques employed are based on the flow of a liquid medium through the filter medium in a reverse direction, i.e., from downstream side to the upstream side of the filter, sometimes with the inclusion of a gas, normally air, to produce turbulence in the liquid stream. The usual liquid is an increment of the filtrate previously filtered, although other liquids may be employed as well.

While the present invention has been developed in the context of condensate polishing operations in nuclear power generating plants, there are a wide variety of filtration requirements in other contexts suited for the employment of the present invention. The present invention is effective in any filtration operation where the level of contaminant is particularly high, or where very large volumes having low levels of contaminant must be filtered, and where long filter life and effective cleaning are of particular significance.

OBJECTS OF THE INVENTION

One object of the present invention is to provide an improved method for backwashing of pleated filters.

Another object of the present invention is to provide improved filters adapted to effective cleaning by the backwashing technique.

Another object is the provision of pleated membrane filters adapted to the requirements of condensate polishing prefilters.

Still another object is to provide improved nonwoven pleated filters adapted to the requirements of the backwashing technique to be employed.

SUMMARY OF THE INVENTION

The foregoing objects, and others which will become apparent from the detailed description which follows, are achieved by the method of gas backwashing pleated filters in a filter housing including discontinuing filtration when the filter requires cleaning; withdrawing filtrate from the downstream volume within said housing and the filter core, retaining liquid within the up-stream volume within the housing, and venting the upstream volume to ambient pressure; flowing a gas from said downstream volume within said housing, through said pleated filter, and into an upstream volume within said housing, at an applied pressure sufficient to produce turbulence in the upstream liquid within the housing to produce a scrubbing and flushing action on the surfaces of the filter medium; withdrawing liquid within the up-stream volume of said housing with suspended material removed from said pleated filter and replacing said liquid with a clean liquid; and repeating the cycle of gas flow, draining the upstream volume, and refilling the upstream volume with clean liquid until said pleated filter is cleaned to the required extent. A total of three to five such cycles is typical.

In an alternate embodiment, both the upstream volume and the downstream volume of the housing are drained, and the gas flow is applied as an abrupt pulse across the membrane applied from upstream to blow debris out of the pores of the filter. The debris is accumulated within the upstream volume of the housing, and is flushed out with the minimum volume of liquid. Particularly in the case of polymer membrane filter media, the gas pulse may be more effective at removing debris from the smallest pores of the filter medium.

The two embodiments may also be used in combination to attain the best advantages of both.

BRIEF DESCRIPTION OF THE DRAWINGS

FIG. 3, views a, b, and c, are detail views of the cartridge of FIG. 2.

DETAILED DESCRIPTION

Gas backwash techniques disclosed and claimed in the above identified related patents have not heretofore been applied to pleated filters. It was believed that the requirement for stretching the pores of the hollow fiber membranes was incompatible with the nature of flat sheet pleated filter media and with the integrity of the pleated conformation. There was an expectation that the applied stresses would blow out the pleats and distort or destroy the structure. In addition, flat sheet pleated filter media are not amenable to the stretching of the media to open the pores which had been believed essential to the effective removal of debris from the filter medium.

We have found, to the contrary, that properly governed gas backwashing is highly effective with pleated filters, and provides results which are superior in a number of respects to the usual wet backwashing techniques commonly employed with such filters.

The service life of the filter cartridges is not reduced. Indeed, the effectiveness of the gas backwash ordinarily enhances the service life. The technique has been proven effective with both nonwoven webs and with membrane filters.

The effectiveness of the backwash operation has in turn permitted improvements in the filter cartridges themselves which improve the efficiency and cost effectiveness of the filtration operation still further. These improvements include the provision of higher effective filter area and improved flow rates per cartridge, as discussed in detail below. The method of backwashing and the improved cartridges of the present invention are most effective and preferred for use in the filtration of liquids which contain materials which do not form cohesive films or dynamic membranes on the surface of the filter medium, such as the ferrous oxide particulates which predominate in condensate streams.

The filtration duty cycle of filter cartridges in the context of the present invention is usual in all respects. When the filter requires backwashing, the techniques of the present invention are employed. In general terms, the filtration flow is discontinued, the downstream volume within the core of the filter cartridge and its housing are drained, and the downstream volume is pressurized with gas.

In a first embodiment, the upstream volume is vented to ambient pressure, and the gas suddenly and abruptly flows through the membrane and into the upstream volume. The liquid contained in the upstream volume is mixed in highly turbulent flow patterns within the volume, providing a scouring action on the upstream surface of the filter medium, removing solid debris or filter cake from the surface of the filter and entraining it in the liquid. The liquid is drained from the housing, and the upstream volume is filled with clean liquid, and the gas backwashing flow is again applied. The fill—gas backwash—drain cycle is repeated until the filter is sufficiently cleaned to be replaced in service. Three to five cycles is generally sufficient.

In a second embodiment, both the upstream and downstream volumes are drained. The pores of the filter medium will remain filled with liquid. A rapid application of gas into the upstream volume serves to blow solid debris out of the pores of the filter medium and into the upstream volume of the housing. The debris is flushed out of the upstream volume of the housing with the minimum effective volume of liquid. The filter is rewet, and the gas pulse is repeated, followed by washing for as many cycles as required, typically for three to five cycles.

In the condensate polishing in nuclear power generating plants, the backwash liquid is, of course, collected. We have found that the radwaste volume to be stored is typically less than that produced in liquid backwash operations, and substantially less than the volume produced with expended ion exchange precoat filters.

In typical operations, the pressure drop across the filter will have an initial value of about 5 psi, and a flow rate of about 1 gal per minute per square foot of filter area. In service, it is common to vary the applied pressure to maintain a substantially constant flow rate. When the pressure drop reaches a value of about 7.5 to 10 psi, it is generally desirable to discontinue the filtration and conduct the backwash operation.

In the present invention, the backwash has been observed to restore the filter to the initial conditions.

In the context of large volumes with low levels of contaminants, it is a frequent practice to conduct the backwash operation on a fixed schedule rather than when the pressure drop reaches a threshold. In the context of condensate polishing, for example, it is desirable to plan the backwash schedule. In light of the very low levels of the contaminant to be filtered out of the steam condensate, on the order of 5 to 20 ppb, the backwash cycle is required on the order of once ever twenty to thirty days. In the present invention, a service cycle of forty five to sixty days is possible, both because of the effectiveness of the backwash procedure and the changes in the filter cartridge design made possible by the backwash technique.

The preferred gas to be employed in the backwash operation is normally air. In specialized circumstances other gases may be indicated by the particular nature of the material in the filtercake or in the liquid being filtered, but such circumstances are not usual.

It is also preferred that the gas employed be free of entrained contaminants. When air is employed, for example, it is preferred that it be oil free, to avoid coating the filter medium with the compressor oil, which may contaminate the filtrate stream and reduce the filtration efficiency by rendering the filter medium hydrophobic (or more highly hydrophobic), increasing the pressure requirements on the filtration operation and reducing the time between backwash cycles. In extreme cases, entrained materials in the gas stream may interact with the solids in the filter cake to render it more resistant to the cleaning action of the backwash cycle.

Within constraints, the higher the applied gas pressure, the more effective the cleaning action of the backwash cycle. It is necessary to limit the pressure to assure that the pleated structure maintains its integrity and that the filter medium is not disrupted. On the other hand, the pressure must be sufficient to assure that the cleaning action is as thorough as possible. We typically employ an initial pressure at least twice the bubble point pressure, as measured against water, of the filter medium, preferably about three to five times the bubble point pressure. For the filter media employed in condensate polishing, an initial air pressure of about 80 psi has proved consistently effective.

To be fully effective, the flow of the gas medium must be sustained long enough to provide effective scouring of the filter medium by the turbulence produced in the liquid upstream of the filter. A period of about 10 to 30 seconds is convenient and effective. The initial pressure need not be sustained over the entire period, as it is the initial intense surge which is believed to blow out the debris entrained in the pores of the filter medium; after that the scouring action is required to scour the outer surface of the filter. It is accordingly convenient to pressurize a suitably sized vessel with the gas at an appropriate pressure, e.g. 80 psi, and to continue the flow of the gas through the filter until the reservoir pressure had dropped to about half the applied value, e.g., about 40 psi.

At the indicated pressure, the gas flow is highly effective at producing substantial turbulence within the upstream volume of the filter housing, and effectively scours the surface of the filter medium and other exposed surfaces. The accumulated debris in the filter cake is entrained in the liquid, while the gas passes out of the volume via the venting arrangement. Over the course of a plurality of backwash cycles, the effect is sufficient to restore the filter to initial pressure drop conditions.

While the solids remain entrained in the liquid, the filter housing is drained to remove the wash liquid, including the solid debris and the entraining liquid. It is preferable to do so promptly, before the solids can deposit on the surfaces within the housing, to maximize the proportion removed from the housing.

The wash liquid is collected by any suitable means, such as a receiving tank or the like, for further processing, for disposal, or for storage in the case of radwaste.

Whatever the intended handling of the wash liquid, it is of considerable benefit that the technique of the present invention minimizes the volume produced by liquid backwash techniques, and is considerably less than that usual for ion exchange resin precoat filters. There will be, of course, no ion exchange resin in the wash liquid in the present invention.

Once the wash liquid is drained from the filter housing, the upstream volume is refilled with clean wash liquid, the vent is closed, and the downstream volume is repressurized with the backwash gas. The vent is again opened to produce the backwash flow of the gas. The conditions and operations are conveniently and effectively the same as those of the initial backwash. The volume of wash liquid is again drained and collected, as before.

The backwashing operation of filling with wash liquid, pressurizing, backwashing, and draining is continued through a number of cycles. As noted above, three to five cycles is generally sufficient to restore the filter to the initial filtration pressure drop when the filter is put back on line.

It is often helpful to supplement the basic backwashing operation with an additional rinse step at the end of each cycle, by closing off the housing drain, and flushing the upstream volume with water. Such an additional rinse will often significantly improve the efficiency of removal of the debris removed from the filter.

Some filter cartridges will exhibit some reduction in the filtration duty cycle over time. Generally, as described below, the preferred filter cartridges of the present invention exhibit little or no decline from the initial duty cycle. Even for other cartridges, however, the effect is less than that observed with liquid backwash techniques, and even the reduced duty cycles are ordinarily satisfactory, whether measured in cycle time to a particular pressure drop tolerance, to the weight of solids accumulated on the filter, or in establishing an acceptable backwash cycle for scheduled operation. The decline, when it is observed, is generally limited to the first three to five duty cycles, and thereafter generally stabilizes at a suitable level.

The efficiency of filtration of filter cartridges employed in the present invention typically does not change measurably over the life of the cartridge. In some cases, partial plugging of some pores will increase the filtration efficiency over time.

The number of wash cycles and the service life of the cartridges employed in the present invention will be dependent largely on the materials employed, the construction techniques of their fabrication, and other parameters not related to the particular features of the present invention.

Testing indicates that the life and duty cycle of any particular filter cartridge is likely to be extended when compared to the same application based on liquid backwash techniques.

Accelerated testing and evaluation of the improved filter cartridges, as described in detail below, by the techniques usual in the industry, predict a cartridge life span of four to five years in service in the context of the nuclear power generating condensate polishing prefilter application, with monthly backwash cycles. An even longer life span may result if the backwash operation of the present invention is performed on a longer schedule or only when the pressure drop across the filter increases to a defined limit. In the nuclear reactor condensate polishing operation, typical limits would be an initial pressure drop of about 5 psi, increasing over the filtration duty cycle to a limit of about 7.5 to 10 psi.

When compared to the typical ion exchange resin precoat filter commonly employed in the industry, the present invention offers a number of decided advantages.

Not least is the elimination of the expensive and voluminous ion exchange resin itself. Cartridges for use in the present invention are economically attractive when compared to the precoat filters.

Another major advantage is the elimination of sensitivity to turbulent flow conditions within the filter housing, which can disrupt the uniformity of the particulate layer of the precoat resin which is a critical parameter in the reliability of the filtration operation. Discontinuities in the resin layer are a major source of downtime in the operation of precoat filters. Such features are not a factor in the present invention.

The present invention offers a material reduction in the waste volume produced from the filtration operation, both by eliminating the volume of the ion exchange resin and by producing the waste liquid in higher concentration than is possible with the precoat filter systems.

Over time, absolute filters are more reliable at protecting the final filter from fouling and poisoning by the passage of particles which cannot be removed during the regeneration of the deep bed ion exchange resin final filter. Regeneration of the final filter is required less frequently, as it faces lower levels of challenge from the filtrate of the present invention.

In particular, the exposure of the final filter to larger particles, greater than about 2 µm, is considerably reduced. The absolute filters employed in the present invention are particularly efficient and reliable at removing such larger particles.

The greater reliability of the present invention stems in large measure from the elimination of the critical and time consuming step of applying the precoat resin layer to its septum to assure a uniform coating of the particulate material. The present invention is thus far less vulnerable to errors and delays in such critical operations, and the filtration duty cycle does not require interruption for failures of these operations.

The nuclear power industry proposals to employ absolute filters of nonwoven webs with liquid backwash techniques in condensate polishing has not, so far as is presently known, progressed beyond the experimental evaluation stage. Such filter cartridges are in service in other contexts, however, and their usage is quite familiar in the filtration art.

We have found that the gas backwash technique of the present invention, contrary to expectations, does not disrupt the pleats or damage the flat sheet membranes or nonwoven webs employed as the filter medium. We have also found that the elastic stretching of the pores to permit the escape of entrained particles, as described in the related patents cited above, is not required in the context of the present invention, and that quite acceptable and satisfactory results are obtained without such stretching of the pores.

Indeed, we have found, again contrary to expectations, that the stresses applied to the pleated filter medium in practice of the gas backwash technique of the present invention are, in fact, well tolerated by the pleated construction. We have not observed any distortion of the pleated structure.

The integrity of the pleated structure is of particular importance, as it is the employment of the pleated configuration which affords the considerable effective area of the filters of the pleated cartridge type.

The lower stresses applied, and the greater cleaning effect produced in the method of the present invention serve to increase the useful life of cartridges employed in the context of the present invention.

In fact, the lower stresses have permitted us to develop improved pleated asymmetric membrane cartridges for use in the present invention which differ from those in the prior art in the employment of thinner, more open spacer media, which permits a higher number of pleats in relation to the controlling dimension of the cartridge, which in turn represents a greater filter area per cartridge. We have, as a result, been able to increase the filter area for a standard 10 inch pleated cartridge by about 85%, from 6 square feet to 11 square feet for such uses, while improving the flow rate of filtrate by comparable amounts.

The thinner, more open spacer employed with the asymmetric membranes has also resulted in better cleaning of the filter medium during the backwash cycle, with no loss in the integrity of the filter medium or reduction in the service life. The improvement in cleaning is attributable to the greater ease in dislodging debris from the surface of the filter medium with minimal interference from the spacer.

The improved cleaning during the backwash cycle, and the added surface area of the filter medium, serve to extend the filtration duty cycle between backwashing operations. Typical service cycles are, in the condensate polishing context, on the order of twenty to thirty days. With the cartridges and backwash technique of the present invention, the service cycle can be as long as forty five to sixty days.

As noted above, the backwash cycle itself, i.e., the period of the gas flow, is typically as short as 30 seconds. With the multiple cycles, and the time required to prepare the vessel for backwashing and then to put it back on stream in filtration service, can be quite brief, compared to typical backwash operations.

Typical backwashing produces very considerable amounts of waste. The limited amount of liquid employed in the backwash cycle of the present invention result in the production of reduced volumes of waste, typically only a fraction of the amount normally produced by liquid backwash techniques.

Because the waste is more concentrated, it takes far less space for storage, in the case of low level radwaste, and is easier to process or dispose of in other contexts.

One of the suspected sources of degradation in flow and filtration duty cycles in systems employed with liquid backwash processes may be the gradual accumulation of fouling in the depth of the filter introduced from the downstream side as components of the backwash liquid during the backwash operation. There is no detectable accumulation of any component of the backwash gas in the present invention.

The backwash cycling requirements are quite regular and predictable, lending the control of the filtration, including the backwash operation, to automated control if desired.

Pleated polymer membrane cartridges have gained wide spread acceptance for a number of filtration applications. They have not generally been employed for the very high volume type of filtration involved in condensate polishing because of the cost and number of cartridges required to attain the flow rates required.

The cores to be employed in the cartridges of the present invention are conventional, and can be any suitable core structure available to those in the art. The core is a porous hollow cylinder formed of metal, such as stainless steel or the like, or a molded polymer, such as polyolefins, polyamides, and the like. The core may be open at both ends or only at one end, depending on the type of housing in which it is to be used, in the fashion usual in the art. The usual adaptations to engage the filter housing and to seal the core are employed.

Such cores can be employed in any suitable length, ordinarily in the common industry standard lengths, to produce cartridges of, for example, 10 inches and multiples of 10 inches.

The filter medium is a pleating of a porous polymer membrane having microporous limiting pores and low resistance to liquid flow. A wide variety of such membranes are known in the art, and substantially any can be adapted to the usages of the present invention. We prefer to employ asymmetric membranes, particularly those having an integral skin with pores extending from the skin surface into an underlying support region having a more open porous structure. In the filtration applications of the present invention, we generally prefer to dispose the skin upstream, although the reverse, having the skin disposed in the downstream orientation, may be employed as well, although backwashing is sometimes less effective in the latter case.

It is also possible to employ two membranes in a single cartridge. It is sometimes preferred to dispose the membranes in a skin-to-skin configuration in such cases.

The membrane is pleated together with an upstream and a downstream spacer which provides drainage space between the pleats to assure free flow of liquid. The spacer material also provides structural support for the membrane and the pleated configuration in the cartridge. The spacer materials employed in the cartridge of the present invention are thinner, lighter and are generally more open, than are commonly used with the asymmetric microporous membranes. More specifically, the spacers are less than about 250 micrometers in thickness, have a weight of less than about one ounce per square yard, and produce an arrestance of less than 80% to AC Coarse Dust at a challenge of 0.5 grams per liter of water.

A variety of such spacer materials are available, including nonwoven polymer fiber webs, extruded polymer mesh, and the like. Suitable polymers include polyolefins, particularly polypropylene, polyesters, preferably polyethylene terephthalate and/or polybutylene terephthalate, and a variety of other materials.

As those of ordinary skill in the art will appreciate, the thinness of the spacer material permits a higher number of pleats than does a thicker, more usual support material. The higher number of pleats, in turn, affords a higher membrane surface area and higher flow rates of liquid through the filter medium in use.

The openness of the spacer material, measured in arrestance or some other conventional measure employed in the art, relates to the ease with which the backwash technique of the present invention will remove the debris accumulated at the membrane surface without being trapped between the membrane and the upstream spacer.

For convenience, we generally employ the same spacer material both upstream and downstream of the membrane. This is not a requirement of the invention, however, and different spacer materials may be employed if desired, with one qualification. It is important in many filtration operations that no fibers or other debris slough off from the spacers into the filtrate stream. This requirement is most significant to the downstream spacer material. Spacer debris is not desirable upstream, but the material will generally be caught by the membrane filter medium, and will not pass into the filtrate.

When the membrane and the two spacers are combined and pleated, the thinner spacer materials permit the employment of a substantially greater number of pleats in relation to the dimensions of the cartridge, providing a substantial gain in the working filter area. The higher area is important to minimize the number of cartridges required to filter a given flow rate of the liquid to be filtered.

The flow rate through the filter is governed by the specific nature of the membrane, the applied pressure drop across the membrane, and the working membrane area. Since the porosity of the membrane is relatively fixed, and the applied pressure is defined by the system and limited by the nature of the filter medium, the filter area is the only parameter available in most circumstances for gains in throughput.

The gains in surface area in the present invention compared to the prior art is considerable. The effective filtering area of our cartridges has been increased to 10 ft$^2$ for a 10 inch cartridge, compared to a typical 6 ft$^2$ in the prior art, including our own prior cartridges. In the present invention, we obtain from about 140 to about 160 pleats on a standard one inch diameter core, or from at least about 30 to about 50 pleats per inch of core circumference.

Pleating operations are themselves wholly conventional, and well understood to those of ordinary skill in the art. Nothing in the present invention changes the equipment or procedures employed, other than the number of pleats employed.

Endcaps are employed to seal and isolate the upstream and downstream sides of the membrane. These structures, and the equipment and procedures of applying the endcaps to the cartridge are not a part of the present inventions, and are wholly conventional. So long as the required functions of endcaps are attained, any of the conventional structures employed in the art will be suitable.

We prefer to enclose the pleated structure within an outer perforated cage structure to protect the pleats during handling. Such cages are well known in the art.

Figure 1:
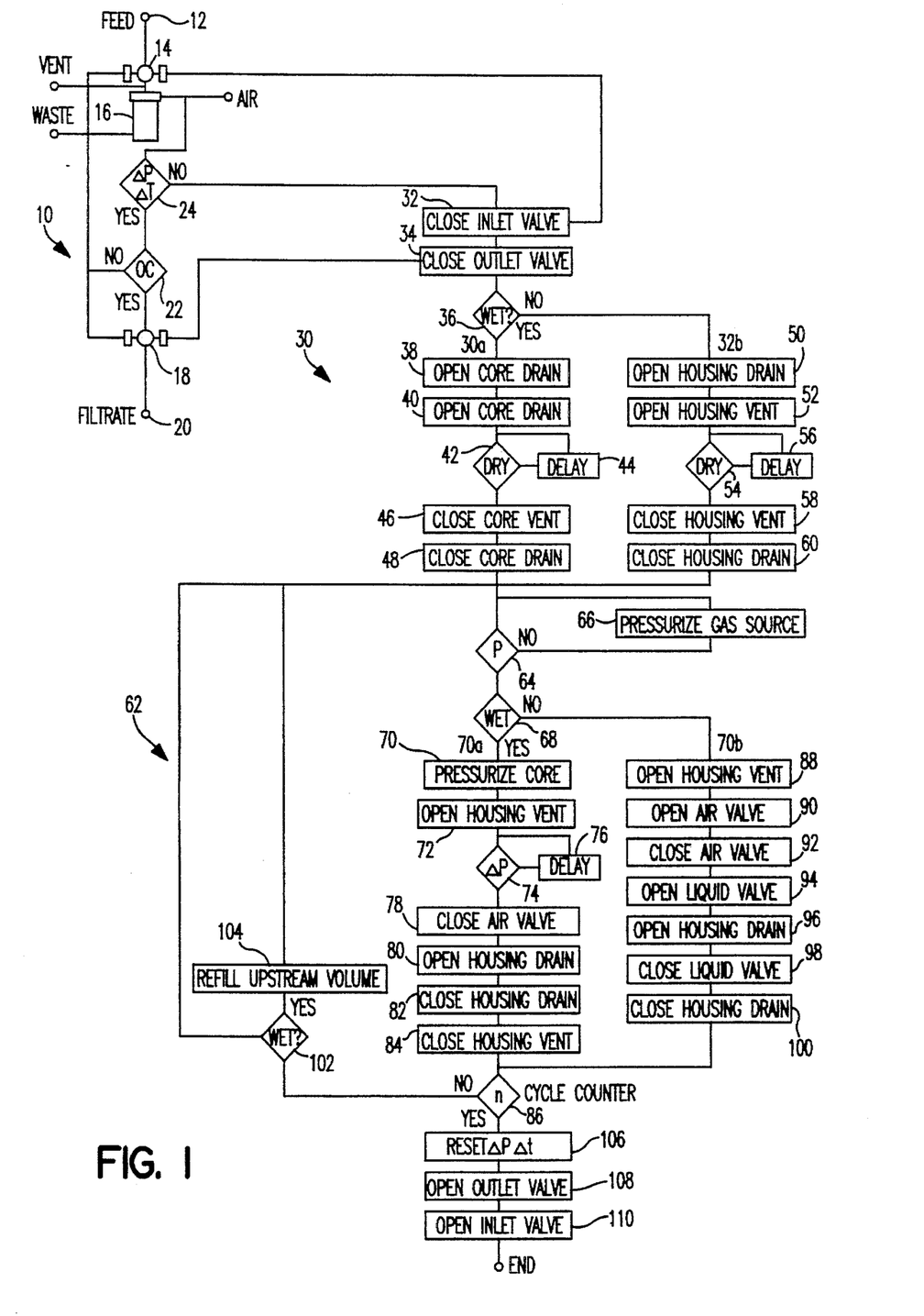
FIG. 1 is a process flow diagram illustrating the method of the present invention.

The practice of the present invention is illustrated in the process flow diagram in FIG. 1.

As shown in FIG. 1, a main filtration operation (10) has a feed inlet (12), controlled by inlet valve (14). The feed passes into filter housing (16), where particulate debris is removed, and filtrate, controlled by outlet valve (18), passes out of the filter system through outlet (20).

The filtration circuit is desirably provided with a quality control detector means (22), which monitors the filtrate for unacceptable levels of debris, and which shuts valves (14) and (18) should the filter fail. The detector may be any suitable monitoring means known to the art.

The filtration circuit is also provided with a backwash controller (24) which includes a differential pressure gage, a timer, or both. When the pressure drop across the filter reaches a set point, or when an established time limit is reached, or whichever is reached first, the backwash controller (24) initiates the backwash cycle.

The steps of the backwash operation begin with the steps illustrated in the initiation stage (30), which commences by closing the inlet valve (14) in step (32), and by closing outlet valve (18), in step (34).

If the procedure is to be conducted with the liquid retained in the upstream volume of the filter housing (16), as defined by decision (36), only path (30a) is actuated. If the decision (36) is set to employ a blow back into a drained upstream volume, both pathways (30a) and 30(b) are actuated.

In pathway (30a), which is conducted for both optional embodiments, the core drain is opened (38), the core vent is opened (40), and the level of liquid within the core is monitored (42), and the condition is continued until the core is fully drained (44). The core vent is closed (46), and the core drain is closed (48). The clean filtrate drained from the core is generally either recycled to feed or is passed to waste.

If the upstream volume is to be drained, pathway (30b) is also actuated, in addition to pathway (30a). The housing drain is opened (50), the housing vent is opened (52), and the level of liquid is monitored (54) until drainage is complete (56). The housing vent is closed (58), followed by closing the housing drain (60).

Once the filter and housing are prepared in section (30), the actual backwash operation is conducted in section (62). The first step is to test the gas supply and pressure (64); if required, the pressure of the gas is brought to the correct level (66).

If the system has been set to backwash against liquid in the upstream volume, the steps set out in path (70a) are conducted. If the upstream volume has been drained, the steps of pathway (70b) are selected.

In the former case, with liquid in the upstream volume, the core volume is pressurized with the backwash gas (70), preferably air. When the pressure is established within the core, the housing vent is opened (72), which causes the air to blow through the filter medium and into the liquid in the upstream volume, producing a high level of turbulence and an active scrubbing action on the surfaces of the membrane, spacer and the interior of the housing. The solid debris accumulated in and on the filter is dislodged and blown into the liquid, where it is entrained. The gas flow through the filter medium and the generation of turbulence in the upstream liquid is continued for a fixed time or until a desired quantity of gas flow has been provided, or until a defined pressure drop in the gas feed system has occurred. The appropriate condition is detected (74), and the flow continued (76) until the condition is satisfied.

Once the condition imposed on the gas flow is satisfied, the air valve is closed (78), the housing drain is opened (80) and the liquid with its entrained burden of solid debris is passed to waste. Once all the liquid is drained, the housing drain is closed (82) and the housing vent is closed, completing a single backwash cycle and, conveniently, incrementing a counter (86) or other means to track the progress of the operation.

Optionally, but often desirably, it may be productive to rinse the upstream volume by flushing it out with clean liquid prior to incrementing the counter. To do so, the housing vent is left open, while the housing drain is closed. Clean liquid is pumped into the upstream volume, and the housing drain is opened to remove the rinse liquid to waste. Such an intermediate rinse is often helpful to remove debris within the housing with greater efficiency.

If the counter (86) indicates another backwash cycle is intended, the upstream volume is refilled (104), and the process returns to pressure test (64) to begin another cycle. The number of cycles to be conducted may be predetermined and set into counter (86).

When the backwash operation is performed with the upstream volume of the housing drained, the procedure is somewhat different as shown in pathway (70b). In that pathway, the housing vent is opened (88), and then the air is blown through the filter (90). The steps are the reverse of the procedure of path (70a), and the difference is significant. When the housing is drained, liquid will remain within the pores of the filter medium. When the blowing is commenced, it is desirable that the pressure rise within the core be as sudden and abrupt as possible and particularly that the pressure be increased at a rate more rapid than the blow out of the liquid in the pores. If this is done, a high pressure drop across the filter medium will be established, and the debris blocking the pores will be effectively blown out. To facilitate the operation, it is preferred that the gas lines have as large a cross sectional area as possible to ensure the most rapid possible pressure buildup in the upstream volume.

In an alternate approach, it is possible to pressurize both the upstream and downstream volumes with the gas, and when both are fully pressurized, the housing vent is opened to rapidly vent the upstream volume and produce the same high pressure drop across the filter medium.

The solid debris is blown into the upstream volume of the housing, where the majority falls to the bottom of the housing. The air valve is closed (92), and a rinse liquid is passed into the filter housing by opening a liquid valve (94), which may feed rinse liquid into the core and through the membrane or into the upstream volume where it rinses the upstream surfaces, or both. The debris blown out of the filter medium is entrained in the rinse liquid, whereupon the housing drain is opened (96) to drain the liquid and its entrained burden of debris to waste. The liquid valve is closed (98), and finally the drain is closed (100). As those of ordinary skill in the art will recognize from the present discussion, the rinse step is not optional in the instant case as it is when the liquid is retained in the upstream volume of the housing. Cycle counter (86) is incremented, and if another backwash cycle is indicated, the process returns to pressure test (64) to begin the next cycle.

As indicated in FIG. 1, each cycle can be independently designed to follow either of the alternate pathways, combining the two techniques, and obtaining the best benefits of each. As already noted in the discussion above, drainage of the upstream volume within the housing can result in improved blow out of blocked membrane pores, but may come at the expense of the thoroughness of cleaning of the surface of the membrane because the turbulent scouring action of the liquid is not available. Thus, by combining both techniques, it may be possible to obtain the best of both.

As those of ordinary skill in the art will readily recognize, the process can be reduced to a highly deterministic operation well suited to numerical control techniques. When the filtration system is dealing with radioactive wastes and other hazardous materials, such automated process controls may be highly desirable to minimize the exposure of personnel to the operation and to afford the added reliability of programmed operations with remote monitoring.

Figure 2:
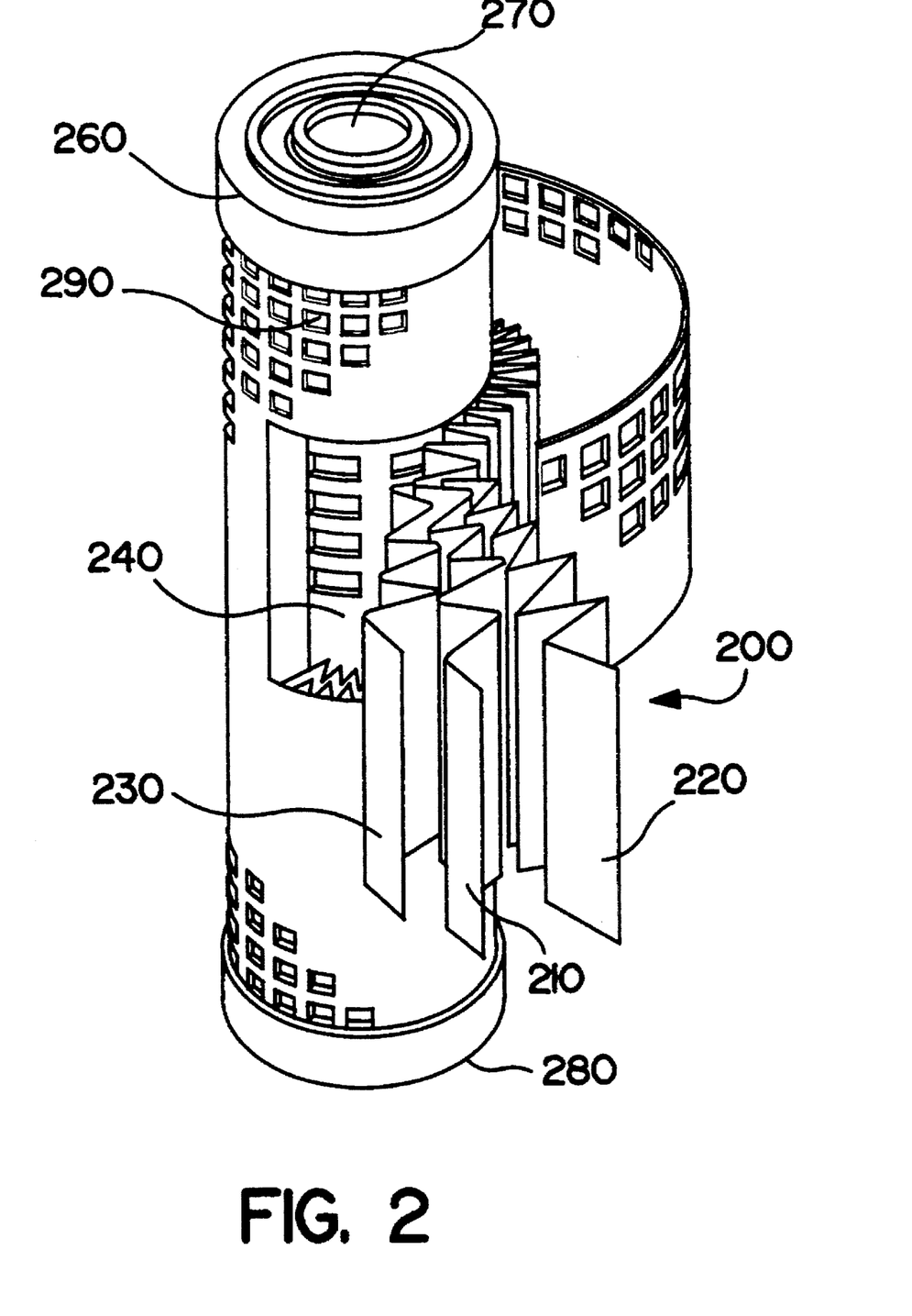
FIG. 2 is a partially cut-away perspective view of a filter cartridge of the present invention.

A preferred form of the membrane filter cartridge of the present invention is shown in FIG. 2.

In FIG. 2, a filter cartridge of the present invention is shown, having pleated filter medium (200), made up of porous membrane (210) sandwiched between upstream spacer (220) and downstream spacer (230). The pleating is applied annularly around central core (240), and is enclosed within the confines of outer cage (250). The ends of the pleats are sealed by an upper endcap (260), which in the case illustrated, has a closed end which blocks the central core (270), and by a lower endcap 280.

Figure 3A:
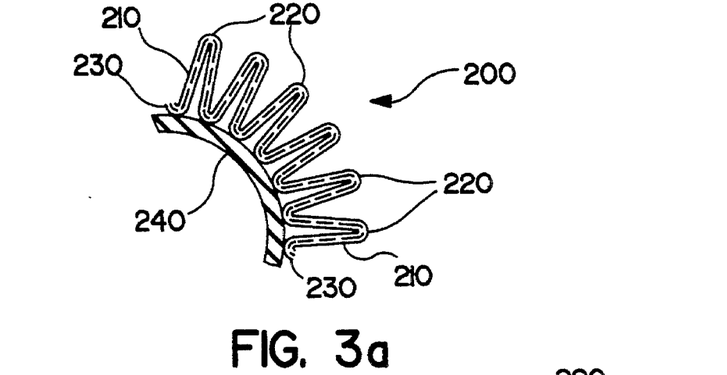
Figure 3B:
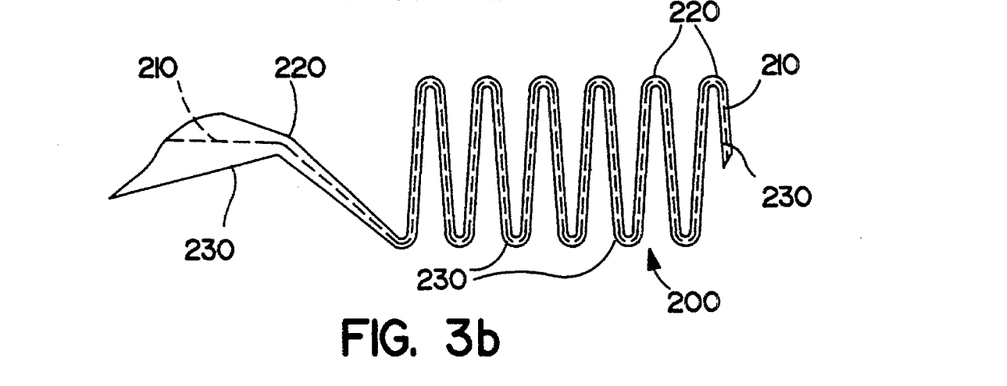
Figure 3C:
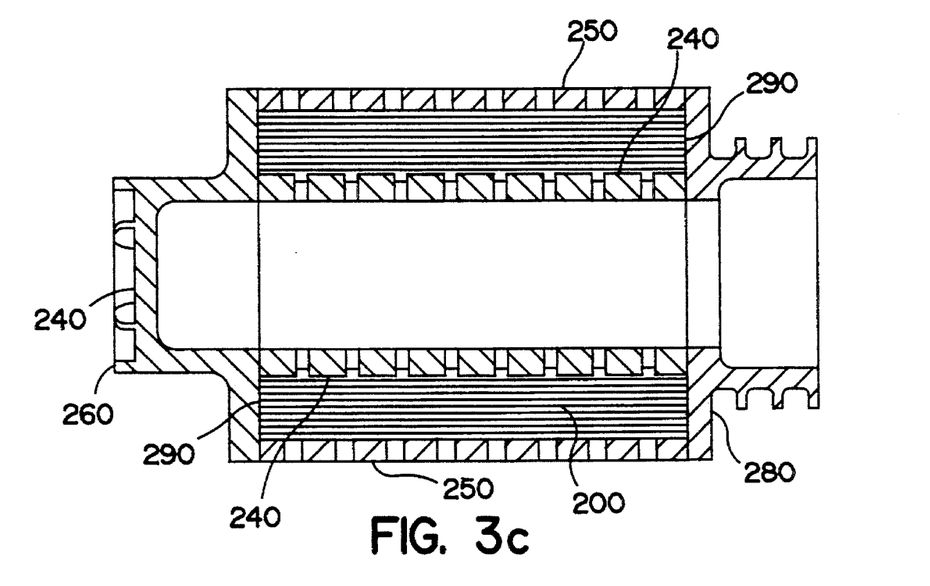

FIGS. 3a, 3b and 3c illustrate details of the cartridge of FIG. 2. In FIGS. 3, the reference numbers are the same as those employed in FIG. 2 for the same elements. As those of ordinary skill in the art will readily recognize, the pleated structure is seamed, by thermal bonding, adhesive bonding, RF welding, ultrasonic welding, or other familiar techniques known in the art to finalize placement of the annular pleated structure around the core. The seal (290) between the pleats and the endcaps is similarly formed.

The cartridges of the present invention can be built and employed for use in any of the many forms of filter housings commonly used in the filtration of liquids. In large volume filtration operations, it is common to employ multiple cartridges in a single housing, with feed into the interior upstream volume, passing the liquid through the filter medium to the interior of the filter cores, which are manifolded to a common header volume, and then out of the housing. In other contexts, a plurality of housings may be employed having a single cartridge in each. While the plural single cartridge housings offer several advantages, the cost is generally higher.

Figure 4:
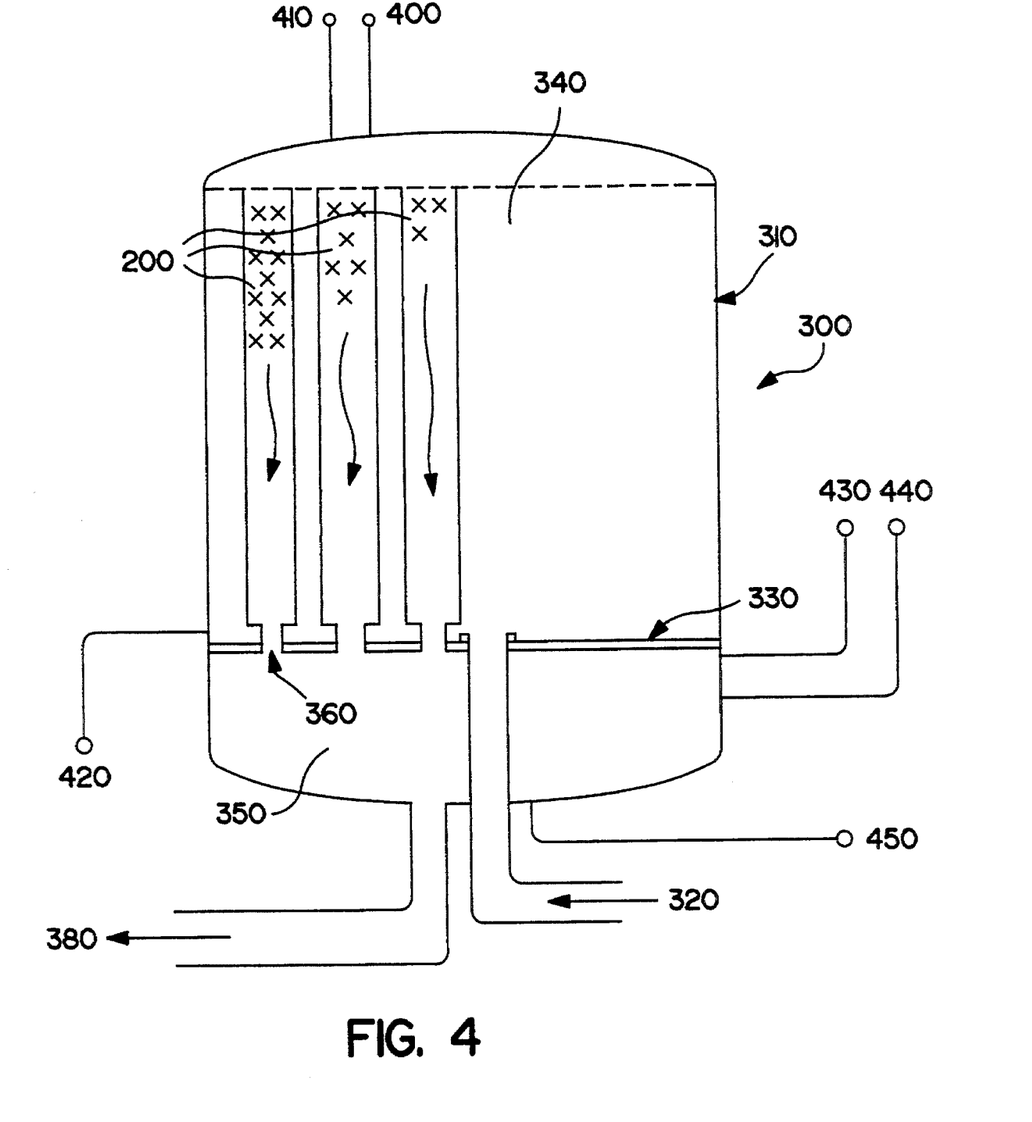
FIG. 4 is a stylized cross-section view of a filter housing containing a multiplicity of the cartridges of the present invention, adapted to the practice of the method of the present invention.

A representative illustration of a multiple cartridge filter housing (300) is shown in FIG. 4. A vessel (310) is provided with an inlet (320), passing through an internal baffle plate (330) defining an upper chamber (340) and a lower chamber (350). The baffle plate (330) is provided with ports (360) adapted to receive a plurality of filter cartridges (200) in a sealed relationship, such that chamber (350) is in communication with the interior of the cores, as shown in FIGS. 2 and 3c, of the cartridges (200). Thus, the upper chamber (340) is isolated from lower chamber (350) by the filter medium of cartridges (200). Chamber (350) is provided with a filtrate outlet (380). Inlet (310) and outlet (380) are each provided with valves to shut off flow when required. Upper chamber (340) is provided with a vent (400) and a gas inlet (410), and drain (420), each equipped with a shutoff valve. The lower chamber (350) is also equipped with a vent (430), inlet line (440), which may be for gas or for rinse liquid, or both, and a drain to waste (450), each of which is also equipped with a shutoff valve. For the sake of clarity, the conventional and commonly employed valves are not shown.

The filter cartridges (200) may engage and seal the ports (360) by any of the techniques commonly employed in the art, including the use of "risers," or other conventional arrangements. The end cap of the cartridge must be chosen to mate with the ports, as is customary in the art. The cartridges will typically be physically located and supported at the closed (top) end; these expedients are also common in the art. Again for the sake of simplicity and clarity, details of such conventional features are not shown.

The filter housings which are in use with no provisions for gas backwashing can generally be adapted to the practice of the present invention by feeding gas into the downstream filtrate lines outside the filter housing, with the incorporation of suitable valving to isolate the gas flow from the filtrate flow path during the backwash operation.

The housing should be provided with a separate drain for the withdrawal of the backwash effluent to minimize the deposition of the effluent debris in the feed stream plumbing. If necessary, however, the backwash effluent may be withdrawn through the liquid feed line. When separate drainage is provided, we prefer that it be installed in the bottom of the housing so that the removal of the debris is aided by gravity.

The backwash effluent handling, once drained from the housing, will be dependent on the nature of the debris entrained in the effluent, and is not itself a part of the present invention.

We claim:

1. The method of gas backwashing pleated filters in a filter housing, said pleated filter having pores, said pores having a bubble point, said pleated filter defining an upstream volume and a downstream volume within said housing, comprising the steps of:

A. discontinuing filtration;

B. withdrawing filtrate from said down-stream volume within said housing, establishing a gas pressure of at least about twice said bubble point of said filter in said downstream volume within said housing, and venting said upstream volume to ambient pressure;

C. flowing gas from said downstream volume within said housing, through said pleated filter, and into an upstream volume within said housing, at an applied pressure sufficient to blow solids out of said pores of said filter medium;

D. withdrawing solids within said up-stream volume of said housing by entrainment of material removed from said pleated filter in a wash liquid; and E. repeating steps B, C, and D in a cycle until said pleated filter is cleaned to the required extent.

2. The method of claim 1 wherein said backwashing method is conducted on a schedule.

3. The method of claim 1 wherein said backwashing method is conducted when a pressure drop across the filter reaches a limit.

4. The method of claim 1 wherein said applied pressure is at least about twice said bubble point of said pleated filter.

5. The method of claim 1 wherein said applied pressure is from about 2 to about 10 times said bubble point of said pleated filter.

6. The method of claim 1 wherein said applied pressure is from about 3 to about 5 time said bubble point of said pleated filter.

7. The method of claim 1 wherein said liquid is collected.

8. The method of claim 1 wherein the number of said cycles is determined by the filtration characteristics of said cleaned pleated filter.

9. The method of claim 1 wherein the number of said cycles is determined to minimize the volume of liquid withdrawn from said upstream volume within said housing in relation to the total volume of liquid filtered through said pleated filter.

10. The method of claim 1 wherein liquid is retained within the up-stream volume within said housing when the upstream volume is vented to ambient pressure, and said gas flow produces turbulence in the upstream liquid within said housing.

11. The method of claim 1 wherein liquid is drained from the up-stream volume within said housing prior to initiating said gas flow from said downstream volume to said upstream volume.

* * * * *